Aug. 19, 1952  R. G. SHEIDLER  2,607,874
INDICATOR FOR ELECTRIC RANGES
Filed April 3, 1950  3 Sheets-Sheet 1

INVENTOR.
Robert G. Sheidler
BY
Chas. H. Trotter
Atty.

INVENTOR.
Robert G. Sheidler
BY Chas. H. Trotter
Atty.

Aug. 19, 1952 — R. G. SHEIDLER — 2,607,874
INDICATOR FOR ELECTRIC RANGES
Filed April 3, 1950 — 3 Sheets-Sheet 3
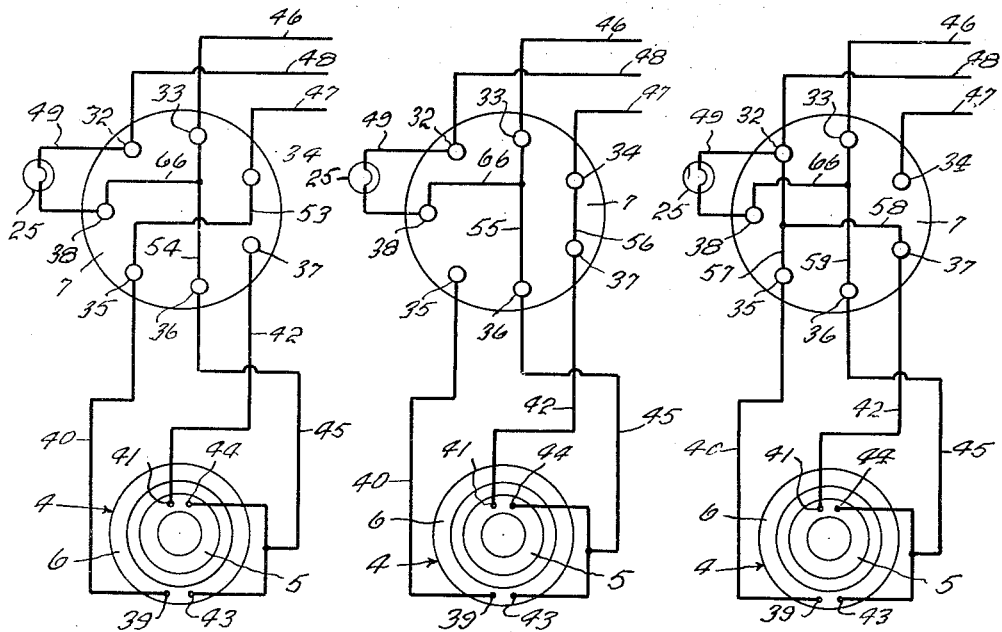
Fig. 8  Fig. 9  Fig. 10
Fig. 13
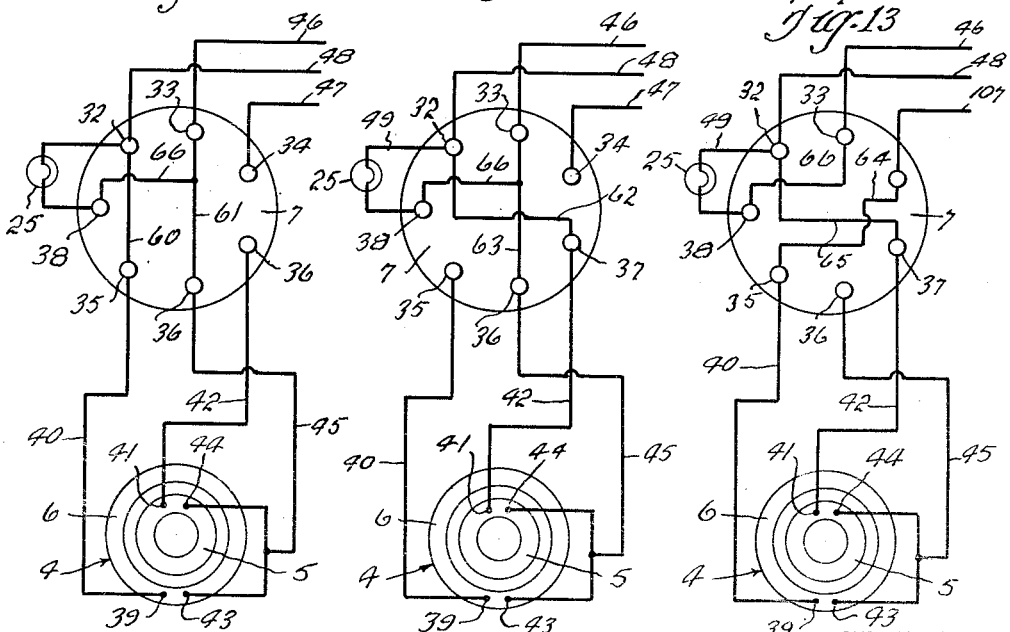
Fig. 11  Fig. 12
INVENTOR.
Robert G. Sheidler
BY Chas. H. Trotter
Atty.

Patented Aug. 19, 1952

2,607,874

UNITED STATES PATENT OFFICE 2,607,874

INDICATOR FOR ELECTRIC RANGES

Robert G. Sheidler, Mansfield, Ohio, assignor to The Tappan Stove Company, Mansfield, Ohio, a corporation of Ohio Application April 3, 1950, Serial No. 153,654

3 Claims. (Cl. 219—20)

This invention relates to indicators for electric cooking ranges by which one can tell at a glance the condition of an electric heating unit therein. It is especially designed and adapted for use on electric cooking ranges wherein the energization of the heating units is controlled by standard switches of the push button type; and it is a modification of the mechanism shown in my copending application Serial No. 146,453, filed February 27, 1950. The subject matter of the present application is also related to that of my copending application Serial No. 163,756, filed May 23, 1950.

Standard electric heating units for cooking ranges generally comprise a pair of concentrically arranged resistance elements which are adapted to be energized either in conjunction with each other or independently of each other in varying degree in order to generate different amounts of heat. As shown herein the energization of the resistance elements is controlled by a suitable standard switch of the push button type.

The embodiment of my invention disclosed herein is shown and described in connection with a heating unit having two concentrically arranged standard resistance heating elements which are adapted to be connected by a standard push button switch to a three wire 220 volt transmission system. The switch is arranged to selectively supply current to the resistance elements at either 220 or 110 volts. The two elements may be simultaneously connected to the transmission system or either one alone may be connected thereto. For the purpose of illustration I have shown a heating unit having an outer heating element, which will produce 700 watts at 220 volts, and an inner heating element which will produce 500 watts at 220 volts. At 110 volts the outer and inner elements will produce 175 and 125 watts, respectively. From this it follows that when the outer and inner elements are simultaneously energized in parallel at 220 volts the unit will produce 1200 watts; and when the elements are simultaneously energized at 110 volts in parallel the unit will produce 300 watts. When the outer element alone is energized the unit will produce 700 watts at 220 volts and 175 watts at 110 volts; and when the inner element alone is energized the unit will produce 500 watts at 220 volts and 125 watts at 110 volts. When the outer and inner elements are simultaneously energized in series at 110 volts the unit will produce 75 watts. From this it will be seen that the unit may be selectively set by the switch to produce either 1200 watts, 700 watts, 500 watts, 300 watts, 175 watts, 125 watts or 75 watts. Generally when cooking the heating unit is substantially covered by the cooking utensil. Consequently one cannot see the heating elements to tell how they are energized. Furthermore even when the elements are exposed to view it is not always possible to tell by looking at them just which element is energized and how it is energized especially at 110 volts. Therefore I provide a visual indicator by which one can tell at a glance the exact condition of a heating unit. For the most efficient and economical operation of a heating unit in an electric cooking range it is not only necessary for one to know whether a heating unit is generating high, medium or low etc., heat but it is also very essential that one know which element or elements of a two element heating unit is energized and to what degree. In cooking it is generally customary to first set a heating unit at its highest heat generating capacity to quickly heat food up to the proper cooking temperature and then set the unit for a lower heat which is just sufficient to maintain the food at the proper cooking temperature. For instance in boiling vegetables or other food the heating unit is first set a high heat and as soon as the water commences to boil the unit is set for a lower heat which is just sufficient to keep the water boiling. But the highest heat generating capacity of the unit in many instances may not be the proper setting for efficiently and economically quickly raising food to cooking temperature. Using the two element heating unit described herein, in which the inner and outer elements together generate the highest heat, the outer element alone the second highest heat and the inner element alone the third highest heat, let us assume that one wants to boil food in a utensil which covers only the inner heating element. Under this condition the inner element alone should be energized for initially bringing the water to boiling temperature. If both elements were energized the heat from the outer element would be completely wasted, passing up around the outside of the utensil and heating only the handle thereof. If the outer element alone was energized practically all of the heat would be lost and none applied to the utensil thereover without any loss. And there are many other occasions during cooking when it is essential for best results to know which element or elements is energized and to what degree, instead of merely knowing that a unit is set to generate high, medium or low etc., heat.

My improved indicator is incorporated in the push buttons of a standard switch of the push button type. In switches of this type a plurality of push buttons are usually arranged in an annular row about a central button. Each button in the anular row controls a different setting of the switch and through the switch determines the energization of the heating unit. The construction of the switch is such that one may selectively energize the heating elements of a heating unit as desired within the capacity of the switch and the heating unit. The central push button is provided to return the control buttons to their normal off positions. For example, let us assume that one wishes to energize a heating unit to produce its full capacity of 1200 watts. To do this he selects the proper button and depresses it which sets the switch to supply current at 220 volts in parallel to both the inner and outer heating elements. The push button will remain depressed and the switch will remain in this setting until the center button is depressed. The momentary depressing of the center button will return the switch mechanism and the depressed button back to their normal "off" positions.

In accordance with my invention I form the control push buttons in two sections each of different material. The rear section of each button which extends into the switch housing is made of any suitable opaque material, and the forward exposed section is made of any suitable transparent or translucent material. In the forward section of each button I embed a design which simulates the heating unit and the condition of the heating elements when that particular button is depressed. When the control buttons are in their normal "off" positions the designs incorporated therein are not visible except on close inspection. In order to render a design clearly visible when a button is depressed to energize the heating unit I provide means through which the design is illuminated only when the button is depressed.

In the designs simulating the heating elements I use four different colors to indicate different conditions of the heating unit and the heating elements therein, preferably red, orange, yellow and black. Red indicates that 220 volts is applied in parallel to an element or elements; orange indicates that 110 volts is applied in parallel to an element or elements; yellow is used to indicate that 110 volts is applied in series to the two elements of the unit, and black indicates that an element is not energized. To illustrate the use of the indicator, let us assume that the design rendered clearly visible shows both elements red. This indicates that both elements are energized at 220 volts. If the design shows the outer element red and the inner element black it indicates that the outer element is energized at 220 volts and that the inner element is not energized. Likewise if the design shows the inner element orange and the outer element black it indicates that the inner element is energized at 110 volts and that the outer element is not energized.

The principal object of the invention is to provide a very simple, efficient, and inexpensive indicating and control mechanism for visualy indicating which element or elements of a two element heating unit which is controlled by a push button switch in a cooking range is energized and to what degree.

Another object of the invention is to provide an indicating and control mechanism of this character which is controlled by the operation of the heating unit control switch.

Another object of the invention is to provide an indicating and control mechanism of this character which comprises a plurality of designs which simulate various different conditions of a two element heating unit.

Another object of the invention is to provide an indicating and control mechanism of this character, for use in conjunction with a push button switch, which comprises a plurality of designs each of which simulates a different condition of a heating unit, there being a different design incorporated in each control push button.

Other and more limited objects of the invention will be apparent from the following specification and the accompanying drawings forming a part thereof wherein:

Figs. 7 to 13, inclusive, are wiring diagrams, diagrammatically showing the various switching arrangements by which the heating unit is controlled.

Figures 1, 2:
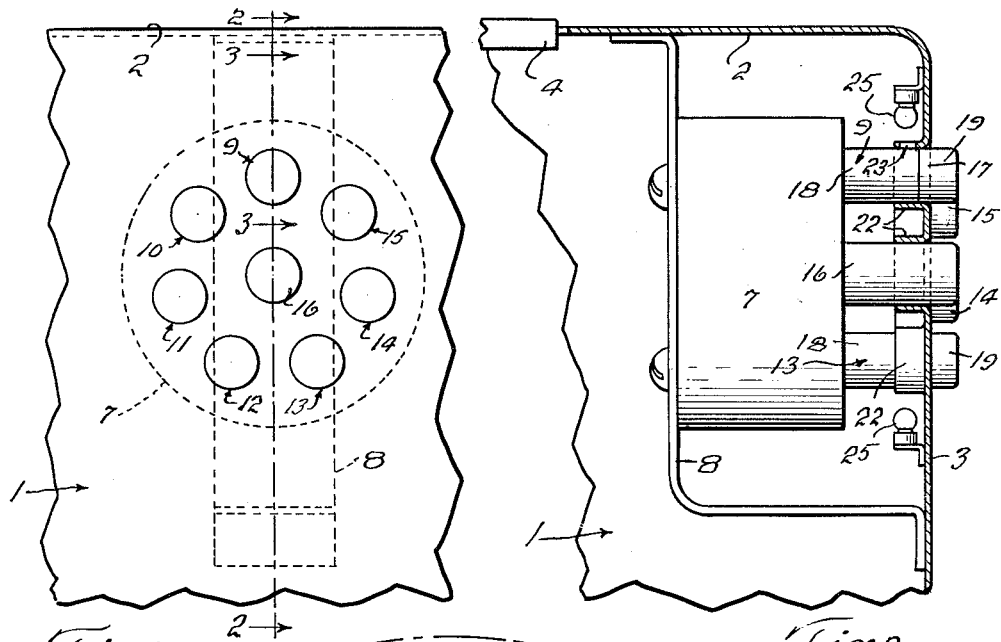
Fig. 1 is a fragmentary front elevation of a portion of an electric cooking range showing the push buttons of a control switch of the push button type extending through the front wall of the range.
Fig. 2 is a vertical section taken on the line 2—2 of Fig. 1, with the switch and push buttons thereof being shown in side elevation.
Figure 6:
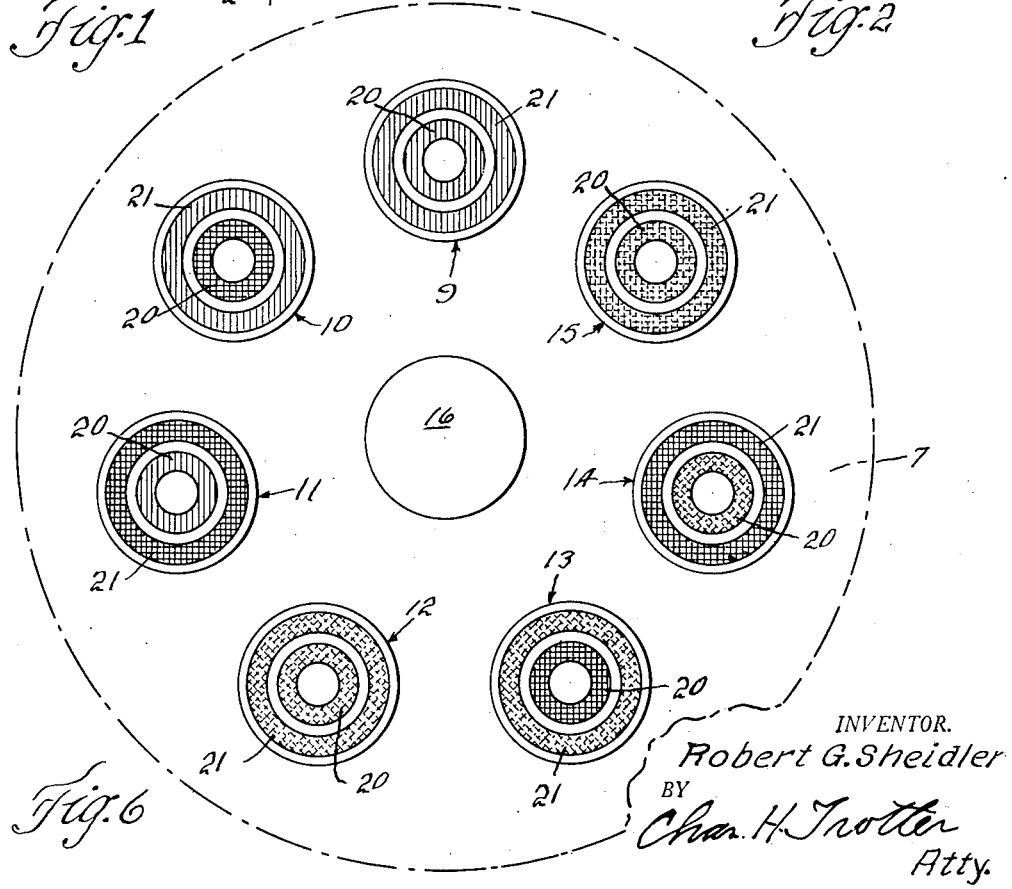
Fig. 6 is a front elevation, on the same scale as Figs. 3 to 5, of the switch and showing the various designs incorporated in the different push buttons.

Referring now to the drawings by reference characters, the numeral 1 indicates generally an electric cooking range having the top wall 2 and the front wall 3. An electric heating unit 4 having inner and outer concentric standard resistance heating elements 5 and 6 is suitably supported by the top 2 of the range. The energization of the heating elements 5 and 6 is controlled by a switch 7 by which the elements 5 and 6 are selectively connected to a three wire 220 volt transmission system. The switch 7 which is suitably secured to a bracket 8 within the range is a seven heat push button switch of standard well known construction. Consequently it is not illustrated in detail herein. The switch 7 has seven control push buttons 9, 10, 11, 12, 13, 14 and 15, arranged in an annular row, and a central reset button 16. Each of the control buttons 9 to 16 when depressed sets the switch mechanism in a different position, and each setting of the switch operates to energize the heating element 4 in a different manner. With this arrangement the switch 7 may be selectively set to energize the resistance elements 5 and 6 as desired. As previously stated, after depressing any control button it will remain depressed until the reset button 16 is momentarily depressed after which the depressed button and the switching mechanism will return to their normal off position, and de-energize the resistance elements 5 and 6.

In order that one may know the setting of the switch 7 and consequently the condition of the heating elements 5 and 6 of the heating unit 4, I provide visual indicating means by which one can tell at a glance the exact condition of a heating unit. To this end I make each of the control push buttons 9 to 15 into two sections suitably secured together to form a single unit. Each control push button comprises two sections suitably secured together at 17 to form a single composite unit. The rear section 18 which extends into the switch housing and is operatively connected therein to the switching mechanism is made of any suitable opaque material; and the forward exposed section 19 is made of any suitable transparent or translucent plastic material. In the exposed plastic section 19 of each control push button I embed a design consisting of two concentric rings 20 and 21 which simulate the inner and outer resistance elements 5 and 6 of the heating unit 4.

In order to simulate the condition of the resistance elements I have colored the rings in the various buttons using a different arrangement of colors in each button. In button 9 I have colored both the inner and outer rings 20 and 21 red. In button 10 I have colored the outer ring 21 red and the inner ring 20 black. In button 11 I have colored the inner ring 20 red and the outer ring 21 black. In button 12 I have colored both the inner ring 20 and the outer ring 21 orange. In button 13 the outer ring 21 is colored orange and the inner ring 20 is colored black. In button 14 the inner ring 20 is colored orange and the outer ring 21 is colored black; and in button 15 both rings are colored yellow. As previously stated, I use the color red to indicate that a heating element is energized at 220 volts; the color orange to indicate that a heating element is energized at 110 volts, and the color yellow to indicate that both elements are energized in series at 110 volts.

Figure 3:
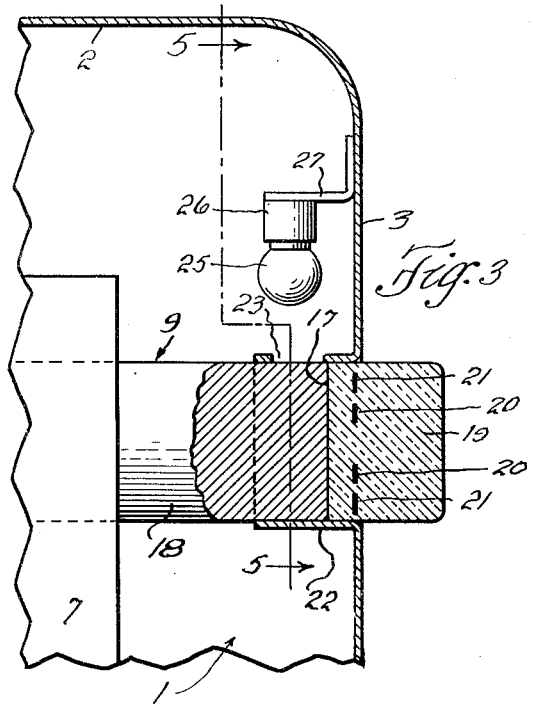
Fig. 3 is an enlarged vertical section taken on the line 3—3 of Fig. 1, with the control push button in normal "off" position, the switch housing being shown in side elevation.
Figure 5:
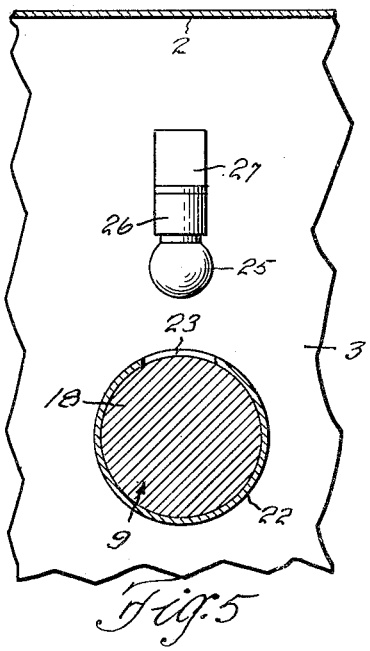
Fig. 5 is a vertical section taken on the line 5—5 of Fig. 3.
Figure 4:
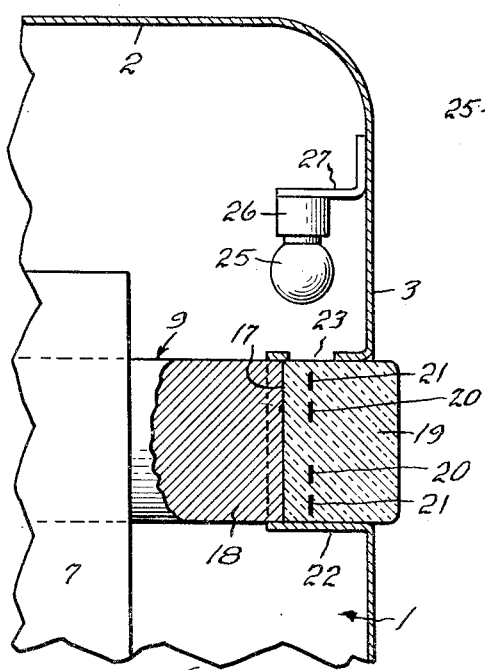
Fig. 4 is a view similar to Fig. 3 with the control push button depressed to set the switch in position to energize a heating unit.

Each control push button 9 to 15 extends out through a cylindrical sleeve 22 which is secured to and extends inwardly from the inner face of the front wall 3 of the range. Each sleeve 22 has a window 23 therein as is clearly shown in Figs. 3 to 5 inclusive. In front of each window 23 I mount a small electric light bulb 25 in a socket 26 which is carried by a bracket 27 secured to and extending inwardly from the inner face of the front wall 3 of the range. The rings 20 and 21 are so positioned in the exposed forward sections 19 of the push buttons that when a push button is in its normal position as shown in Fig. 3 the rings will be disposed between a window 23 and the inner face of the front wall 3 of the range; and when a push button is depressed to energize the heating unit, as shown in Fig. 4, the rings will be directly behind a window 23 in position to be illuminated by light from the bulb 25 passing through the window 23. The energization of each electric light bulb 25 is controlled by its associated push button. When a push button is in its normal "off" position as shown in Fig. 3, its associated bulb 25 is de-energized; and when a button is depressed to energize the heating unit the associated bulb is also energized in order to illuminate the rings 20 and 21. This arrangement of the rings 20 and 21 in the exposed section 19 with respect to the windows 23 and the front wall 3 of the range is such that when the buttons are in their normal "off" positions the rings will not be visible except on very close inspection. But when a push button is depressed to energize the heating element and its associated bulb 25 the rings will be illuminated by light from the bulb 25 and rendered clearly visible from a considerable distance.

Figure 7:
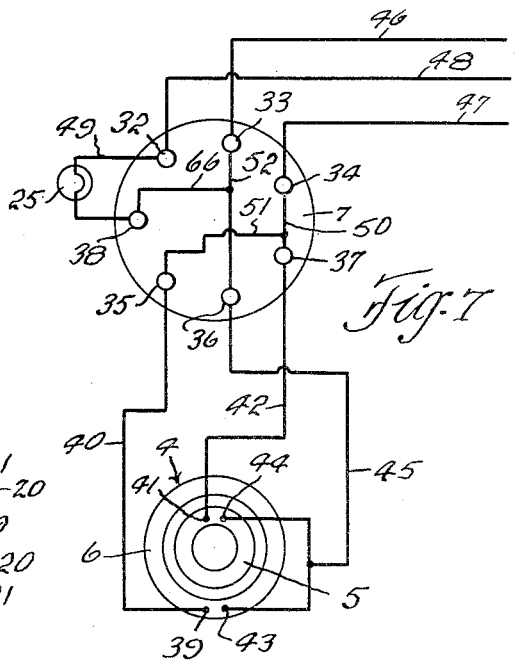

The switching arrangement controlled by button 9 is shown in Fig. 7; that controlled by button 10 is shown in Fig. 8; that controlled by button 11 is shown in Fig. 9; that controlled by button 12 is shown in Fig. 10; that controlled by button 13 is shown in Fig. 11; that controlled by button 14 is shown in Fig. 12, and that controlled by button 15 is shown in Fig. 13.

Referring now to Figs. 7 to 13, inclusive, the switch 7 is shown as having seven terminals as indicated at 32, 33, 34, 35, 36, 37 and 38, respectively. The terminal 39 of the outer heating element 6 is connected to the terminal 35 of the switch 7 by the wire 40, and the terminal 41 of the inner heating element 5 is connected to the terminal 37 of the switch by a wire 42. The terminal 43 of the outer heating element 6 and the terminal 44 of the inner heating element 5 are each connected to the terminal 36 of the switch 7 by the wire 45. The three wires of a 220 volt three wire transmission system are indicated at 46, 47 and 48. Wires 46 and 47 together will supply current at 220 volts, and either of wires 46 or 47 with neutral wire 48 will supply current at 110 volts. Transmission wire 46 is connected to the terminal 33 of the switch 7 and the wire 47 is connected to the terminal 34 of the switch 7. The neutral wire 48 is connected to the terminal 32 of the switch. The electric bulb 25 is connected to the terminals 32 and 38 of the switch 7 by the wire 49. Assuming that the outer heating element 6 will produce 700 watts at 220 volts and 175 watts at 110 volts and that the inner heating element 5 will produce 500 watts at 220 volts and 125 watts at 110, the heating unit 4 will produce 1200 watts when the switch 7 is set as shown in Fig. 7. At this setting the terminal 34 is connected to the terminals 37 and 35 by the lines 50 and 51, and the terminal 33 is connected to the terminal 36 by the line 52. Current will then flow from the wire 46 through line 52 and wire 45 to the terminal 44 of the inner element 5 and to the terminal 43 of the outer element 6. After passing through the inner element 5 the current will flow back to the wire 47 from the terminal 41 through the wire 42 and line 50; and after passing through the outer element 6 the current will flow back to the wire 47 from the terminal 39 through the wire 40 and lines 51 and 50. From this it will be seen that both of the elements 5 and 6 are energized in parallel at 220 volts.

Fig. 8 shows the switch 7 set to energize the outer element 6 only at 220 volts. In this setting the terminal 34 is connected to the terminal 35 by the line 53 and the terminal 33 is connected to the terminal 36 by the line 54. Current will then flow from the wire 46 through the line 54 and wire 45 to the terminal 43 of the outer element 6, and after passing through the element 6 the current will flow from the terminal 39 back to the wire 47 through the wire 40 and line 53.

Fig. 9 shows the switch 7 set to energize the inner element 5 only at 220 volts. In this setting the terminal 33 is connected to the terminal 36 by the line 55, and the terminal 34 is connected to the terminal 37 by the line 56. Current will then flow from the line 46 through the line 55 and wire 45 to the terminal 44 of the inner element 5, and after passing through the element 5 the current will flow from the terminals 41 back to the wire 47 through the wire 42 and line 56.

Fig. 10 shows the switch 7 set to energize the inner and outer elements 5 and 6 in parallel at 110 volts. In this setting the terminal 32 is connected to the terminals 35 and 37 by the lines 57 and 58, and the terminal 33 is connected to the terminal 36 by the line 59. Current will then flow from the wire 46 through the line 59 and wire 45 to the terminal 43 of the outer element 6 and to the terminal 44 of the inner element 5. After passing through the outer element 6 the current will flow from the terminal 39 back to the neutral wire 48 through the wire 40 and line 57; and after passing through the inner element 6 the current will flow from the terminal 41 back to the neutral wire 48 through the wire 42 and line 58.

Fig. 11 shows the switch 7 set to energize the outer element 6 at 110 volts. In this setting the terminal 32 is connected to the terminal 35 by the line 60, and the terminal 33 is connected to the terminal 36 by the line 61. Current will then flow from the wire 46 through the line 61 and wire 45 to the terminal 43 of the outer element 6 and after passing through the element 6 the current will flow from the terminal 39 back to the neutral wire 48 through the wire 40 and line 60.

Fig. 12 shows the switch 7 set to energize the inner element 5 only at 110 volts. In this setting the terminal 32 is connected to the terminal 37 by the line 62 and the terminal 33 is connected to the terminal 36 by the line 63. Current will then flow from the wire 46 through the line 63 and wire 45 to the terminal 44 of the inner element 5, and after passing through the element 5 the current will flow from the terminal 41 back to the neutral wire 48 through the wire 42 and the line 62.

Fig. 13 shows the switch 7 set to energize the inner and outer elements 5 and 6 in series at 110 volts. In this setting the terminal 34 is connected to the terminal 35 by the line 64, and the terminal 32 is connected to the terminal 37 by the line 65. Current will then flow from the wire 47 through the line 64 and wire 49 to the terminal 39 of the outer element 6 and then through the element 6, after which it flows from the terminal 43 of the element 6 through the wire 45 to the terminal 44 of the inner element 5. From the terminal 44 the current flows through the inner element 5 and from the terminal 41 back to the neutral line 48 through the wire 42 and line 65. In all the operative setting of the switch 7 the terminal 33 is connected to the terminal 36 by the line 66 so that an electric light bulb 25 will always be energized whenever the switch is set in an operative position.

From the foregoing it will be apparent to those skilled in this art that I have provided a very simple and efficient means for accomplishing the objects of my invention.

It is to be understood that I am not limited to the specific construction shown and described herein as various modifications may be made therein within the spirit of my invention.

What is claimed is:

1. An indicating and control mechanism for a cooking range electric heating unit having inner and outer heating elements, said mechanism comprising switching means by which the energization of the inner and outer heating elements of a heater unit is selectively controlled, a plurality of push buttons by which said switching means is manually set in selected positions, each of said push buttons controlling a different setting of said switching means, a plurality of different designs each of which comprises two concentric colored rings which simulate the inner and outer heating elements of the heating unit, each of said designs having a different arrangement of colors to indicate different degree of energization of the heating elements, the forward end of each of said push buttons being formed of translucent material, one of said designs being incorporated in the translucent end of each of said push buttons, and means rendered operable by the depressing of a push button in setting said switching means in a selected "on" position to illuminate the design incorporated in the push button from the rear thereof, each of said designs visually indicating which element or elements is energized and to what degree in accordance with the setting of said switch when a selected push button is depressed.

2. An indicating and control mechanism for a cooking range electric heating unit having inner and outer heating elements, said mechanism comprising switching means by which the energization of the inner and outer heating elements of a heating unit is selectively controlled, a plurality of push buttons by which said switching means is manually set in selected positions, each of said push buttons controlling a different setting of said switching means, a plurality of different designs each of which comprises two concentric colored rings which simulate the inner and outer heating elements of the heating unit, each of said designs having a different arrangement of colors to indicate different degrees of energization of the heating elements, the forward end of each of said push buttons being formed of translucent material, each of said push buttons being slidably mounted in a sleeve which extends rearwardly from the inner face of the front wall of the range, a window in each of said sleeves, lighting means operative to project rays of light through a window after the push button associated therewith has been moved to set said switching means in an "on" position, one of said designs being incorporated in the translucent end of each of said push buttons in such a position that it is in alignment with a window when a push button is in position to set said switching means in an "on" position and is out of alignment with a window when a push button is in position to set the switching means in an "off" position, whereby the design in a push button is illuminated after a push button has been moved to set said switching means in an "on" position, each of said designs indicating which element or elements is energized and to what degree in accordance with the setting of said switch when a selected push button is depressed.

3. An indicating and control mechanism for a cooking range electric heating unit having inner and outer heating elements, said mechanism comprising switching means by which the energization of the inner and outer heating elements of a heating unit is selectively controlled, a plurality of push buttons by which said switching means is manually set in selected positions, each of said push buttons controlling a different setting of said switching means, a plurality of different designs each of which comprises two concentric colored rings which simulate the inner and outer heating elements of the heating unit, each of said designs having a different arrangement of colors to indicate different degrees of energization of the heating elements, the forward end of each of said push buttons being formed of translucent material and the rear ends thereof being formed of opaque material, each of said push buttons being slidably mounted in a sleeve which extends rearwardly from the inner face of the front wall of the range, a window in each of said sleeves, lighting means operative to project rays of light through a window after the push button associated therewith has been moved to set said switching means in an "on" position, one of said designs being incorporated in the translucent end of each of said push buttons, the opaque rear end and the translucent front end of each of said push buttons being so proportioned with respect to each other that the opaque section is behind a window when a push button is in position to set said switching means in the "off" position and the translucent section is behind a window when a push button is in position to set said switching means in an "on" position, whereby the design of a heating unit is illuminated after a push button has been moved to set said switching means in an "on" position, each of said designs indicating which element or elements is energized and to what degree in accordance with the setting of said switch when a selected push button is depressed.

ROBERT G. SHEIDLER.

REFERENCES CITED

The following references are of record in the file of this patent:

UNITED STATES PATENTS

| Number | Name | Date |
| --- | --- | --- |
| 2,338,757 | Curran | Jan. 11, 1944 |
| 2,431,904 | Andrews | Dec. 2, 1947 |
| 2,437,555 | Rees | Mar. 9, 1948 |
| 2,450,399 | Sheidler | Sept. 28, 1948 |

FOREIGN PATENTS

| Number | Country | Date |
| --- | --- | --- |
| 723,793 | Germany | Aug. 11, 1942 |

OTHER REFERENCES

Bulletin, "General Electric Ranges," 1941 (page 7 used).